US007624095B2

(12) United States Patent
Majumder

(10) Patent No.: US 7,624,095 B2
(45) Date of Patent: Nov. 24, 2009

(54) FAST COLLABORATIVE FILTERING THROUGH SKETCH FUNCTION BASED APPROXIMATIONS

(75) Inventor: Rangan Majumder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 11/273,944

(22) Filed: Nov. 15, 2005

(65) Prior Publication Data

US 2007/0124698 A1    May 31, 2007

(51) Int. Cl.
*G06F 7/00* (2006.01)
*G06F 17/30* (2006.01)
*G07G 1/00* (2006.01)

(52) U.S. Cl. .......................................... 707/2; 705/10
(58) Field of Classification Search .................. 707/2, 707/3, 5; 705/10, 14, 26
See application file for complete search history.

(56) References Cited

U.S. PATENT DOCUMENTS

| | | | |
|---|---|---|---|
| 6,236,985 B1 * | 5/2001 | Aggarwal et al. | 707/2 |
| 6,356,879 B2 * | 3/2002 | Aggarwal et al. | 705/26 |
| 6,487,541 B1 * | 11/2002 | Aggarwal et al. | 705/26 |
| 2004/0054572 A1 * | 3/2004 | Oldale et al. | 705/10 |
| 2004/0260694 A1 * | 12/2004 | Chaudhuri et al. | 707/5 |

FOREIGN PATENT DOCUMENTS

| | | |
|---|---|---|
| KR | 1020010091506 A | 10/2001 |
| KR | 1020010097722 A | 11/2001 |
| KR | 1020020006905 A | 1/2002 |
| KR | 1020040006515 A | 1/2004 |

OTHER PUBLICATIONS

Halkidi, et al, THESUS: Organizing Web document collections based on link semantics, The VLDB Journal (2003), pp. 320-332, published Sep. 17, 2003, Copyright Spring-Verlag 2003.*
Halkidi, et al, THESUS: Organizing Web document collections based on link semantics, The VLDB Journal, vol. 12, Issue 4 (Nov. 2003), pp. 320-322 +1 page abstract, published online Sep. 17, 2004 - © Springer-Verlag 2003.*
Broder et al, Min-Wise Independent Permuations, 1998, ACM, STOC '98, pp. 327-336.*
Park et al, An Automatic Selection Method of Key Search Algorithms based on Expert Knowledge Systems, Mar. 1994, ACM, SIGIR Forum vol. 28 Issue 1.*
Brodley, Addressing the Selective Superiority Problem: Automatic Algorithm/Model Class Selection, 1993, ICML. (Note: cached copy Accessed Apr. 6, 2009 on citeseer).*
Limbic-Region, Big-O Notation—What is it good for?, perlmonks. org, Big-O Notation—What is it good for?, Limbic-Region (Accessed Apr. 6, 2009).*
Greg Linden, et al. Amazon.com Recommendations: Item-to-Item Collaborative Filtering. IEEE Internet Computing, Industry Report, Jan.-Feb. 2003. pp. 76-80.
International Search Report dated Feb. 23, 2007, for PCT Patent Application Serial No. PCT/US2006/040045, 3 pages.

* cited by examiner

*Primary Examiner*—Pierre M Vital
*Assistant Examiner*—Jason Liao
(74) *Attorney, Agent, or Firm*—Workman Nydegger

(57) ABSTRACT

The claimed subject matter provides systems and/or methods that enable scalable collaborative filtering. A collaborative filtering component can receive data associated with a plurality of user sessions and data associated with at least one of a user and an item. Additionally, the collaborative filtering component can generate a recommendation based on a similarity. Further, an approximation component can approximate the similarity between at least one of the item and disparate items and the user and disparate users.

11 Claims, 11 Drawing Sheets

FAST COLLABORATIVE FILTERING THROUGH SKETCH FUNCTION BASED APPROXIMATIONS

BACKGROUND

Technological advances in computer hardware, software and networking have lead to efficient, cost effective computing systems (e.g., desktop computers, laptops, handhelds, cell phones, servers, . . . ) that can communicate with each other from essentially anywhere in the world in order to exchange information. These systems continue to evolve into more reliable, robust and user-friendly systems. As a consequence, more and more industries and users are purchasing computers and utilizing them as viable electronic alternatives to traditional paper and verbal media for exchanging information. For example, many industries and users are leveraging computing technology to improve efficiency and decrease cost through web-based (e.g., on-line) services. For instance, users can search and retrieve particular information (e.g., via a search engine), view headlines related to available content, purchase goods, view bank statements, invoke monetary transactions (e.g., pay a bill on-line), research products and companies, apply for employment, obtain real-time stock quotes, obtain a college degree, download files and applications, transmit correspondence (e.g., email, chat rooms, . . . ), etc. with the click of a mouse.

As the availability of items (e.g., movies, music, photographs, e-mail, documents, text, word(s), phrase(s), files, video or sound clipets, messages, articles, web page(s), resources available on the World Wide Web, . . . ) utilized in connection with computing technology has increased, the task of effectively filtering, discovering, and managing these items has become increasingly more difficult and cumbersome. Conventional techniques have provided various personalization strategies to enable a user to more efficiently identify and/or access items of interest (e.g., via a search engine, headlines, . . . ). A typical personalization strategy utilizes an explicit input by the user indicating various interests, which can be employed to customize recommendations provided to the user. However, such a technique commonly requires the user to conduct initialization and can be subject to inaccuracies if the user fails to continually update the explicit input to match her current interest(s).

Another conventional technique that facilitates determining preferences of a user is collaborative filtering, which leverages a community to drive implicit personalization. A collaborative filtering system can yield predictions about interests of a user by collecting preference information from a number of users. However, most common collaborative filtering algorithms are not scalable, and thus are typically not able to be applied to large datasets such as datasets associated with the Internet, for example.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate approximating similarities that can be employed in connection with collaborative filtering techniques. Accordingly, scalable collaborative filtering can be performed in association with any system that provides items to users (e.g., computer(s), network(s), Internet, television, radio, . . . ). The approximate collaborative filtering can provide for increased efficiency by sacrificing an adjustable amount of accuracy via computing sketches of users and/or items that can be smaller than an original dataset. Thereafter, the collaborative filtering can be performed upon the approximations.

In accordance with various aspects of the claimed subject matter, a collaborative filtering component can receive data related to a number of user sessions. The collaborative filtering component can employ item-based collaborative filtering and/or user based collaborative filtering. As opposed to conventional techniques that utilize a calculated similarity value obtained by comparing substantially all users to disparate users or substantially all items to disparate items, the claimed subject matter relates to approximating these similarities, thereby reducing computation requirements. For instance, a Jaccard coefficient, a cosine similarity, etc. can be approximated; however, the claimed subject matter is not so limited. The collaborative filtering component can employ the approximated similarities to accordingly generate recommendation(s).

Pursuant to one or more aspects of the claimed subject matter, an approximation component can approximate the similarity between disparate users and/or disparate items. For instance, the approximation component can generate an adjustable number of sketching functions, which can enable varying degrees of accuracy. The sketching functions can be employed in connection with sets of data (e.g., sets of users, sets of items, . . . ) to determine a number of matching min-hash pairs (e.g., collisions). Further, the approximation component can divide the number of matches for each pair by the number of sketching functions to yield the approximate similarity.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
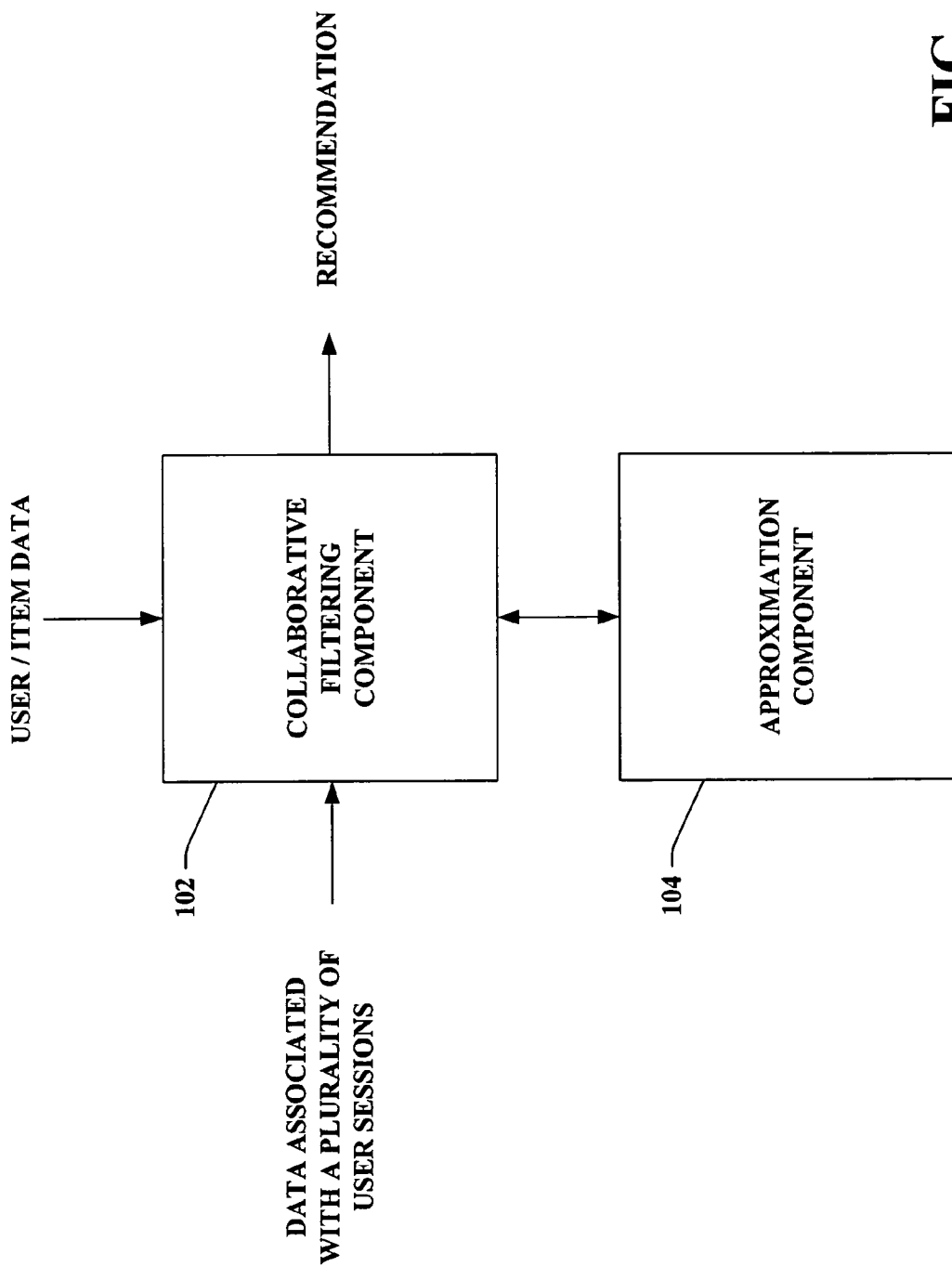
FIG. 1 illustrates a block diagram of an exemplary system that enables employing collaborative filtering to personalize and/or recommend items to a user in connection with a dataset of any size.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that enables employing collaborative filtering to personalize and/or recommend items to a user in connection with a dataset of any size. The system 100 is scalable and can be employed in association with any system that provides items to users (e.g., computer(s), network(s), Internet, television, radio, . . . ). For instance, the system 100 can be utilized in connection with substantially all of the users and substantially all of the web pages associated with the Internet; however, the claimed subject matter is not limited to this example. The system 100 can include a collaborative filtering component 102 that receives data associated with a plurality of user sessions. For instance, web pages that are visited during each user session can be received and/or tracked as implicit votes for those web pages for the particular session by the collaborative filtering component 102. Thus, by visiting the web page, the user can be considered to have rated the web page above a threshold.

Various types of user activity can indicate that the user has rated an item above or below a threshold. Pursuant to an example, the user can explicitly rate, buy, view, display, print, navigate to, navigate from, email, browse to, post, ignore, delete, etc. an item, and these actions can be interpreted by the collaborative filtering component 102 as either rating the item above or below a threshold. The item(s) interacted with by the user(s) can be, for example, movies, music, photographs, e-mail, documents, text, word(s), phrase(s), files, video or sound clipets, messages, web page(s), articles, resources available on the World Wide Web, etc.

The collaborative filtering component 102 can additionally receive data associated with an item and/or a user. For example, the data associated with the item can include a set of users that rated the item above a threshold. Pursuant to another illustration, the data associated with the user can include a set of items rated above a threshold by the user. Additionally or alternatively, this information can be received as part of the data associated with the user sessions. Further, the collaborative filtering component 102 generates a recommendation related to the received data associated with the item and/or the user based on a similarity of the item and/or user to disparate items and/or disparate users.

The system 100 additionally can include an approximation component 104 that can approximate the similarity between items and/or users. The approximation component 104 can sacrifice an adjustable amount of accuracy for performance in linear time by computing sketches of the users and/or items. These sketches can be smaller than the original dataset. Pursuant to an example, the approximation component 104 can evaluate an approximation of a Jaccard coefficient of two sets by utilizing sketches of the sets as opposed to whole sets.

The Jaccard coefficient can be evaluated to determine the similarity between two sets (e.g., associated with disparate users, associated with disparate items, . . . ) as follows:

$$\text{sim}(A, B) = \frac{|A \cap B|}{|A \cup B|}$$

Accordingly, A and B are disparate sets, $|A \cap B|$ is an intersection of the two sets and $|A \cup B|$ is a union of the two sets. Further, the Jaccard coefficient can be extrapolated to multi-sets when ratings exist other than 0 and 1, for example. The approximation component 104 can additionally or alternatively determine an approximation of a cosine similarity between two sets of data (e.g., associated with disparate users, associated with disparate items, . . . ). According to this example, items can be modeled as vectors in an m-dimensional space, where m is the number of user sessions which can potentially be in the millions. The similarity between two vectors is determined by the cosine of an angle of separation between the vectors, which can be evaluated as follows:

$$\text{sim}(i, j) = \cos(\vec{i}, \vec{j}) = \frac{\vec{i} \cdot \vec{j}}{\|\vec{i}\|_2 \times \|\vec{j}\|_2} = \frac{\sum_{u \in U}(R_{u,i} \cdot R_{u,j})}{\sqrt{\sum_{u \in U} R_{u,i}} \cdot \sqrt{\sum_{u \in U} R_{u,j}}}$$

Accordingly, sim(i,j) is the similarity between two vectors, $\vec{i}$ and $\vec{j}$, each corresponding to disparate items. Additionally, u is a user in a set of possible users U, $R_{u,i}$ is a magnitude of a rating associated with user u in the first vector related to a first item, and $R_{u,j}$ is a magnitude of a rating associated with user u in the second vector related to the second item.

Although conventional techniques can identify similarities for an internal web site with a number of items and/or users on the order of millions, these algorithms commonly cannot scale to a number of items and/or users on the Internet. A typical collaborative filtering system that compares every item to every other item evaluates $O(n^2)$ comparisons, where n is the number of items, which can become more inefficient as the number of items increases. Accordingly, the approximation component 104 can mitigate the inefficiency commonly associated with conventional techniques and can enable effectuating a scalable determination of similarity between items and/or users.

Figure 2:
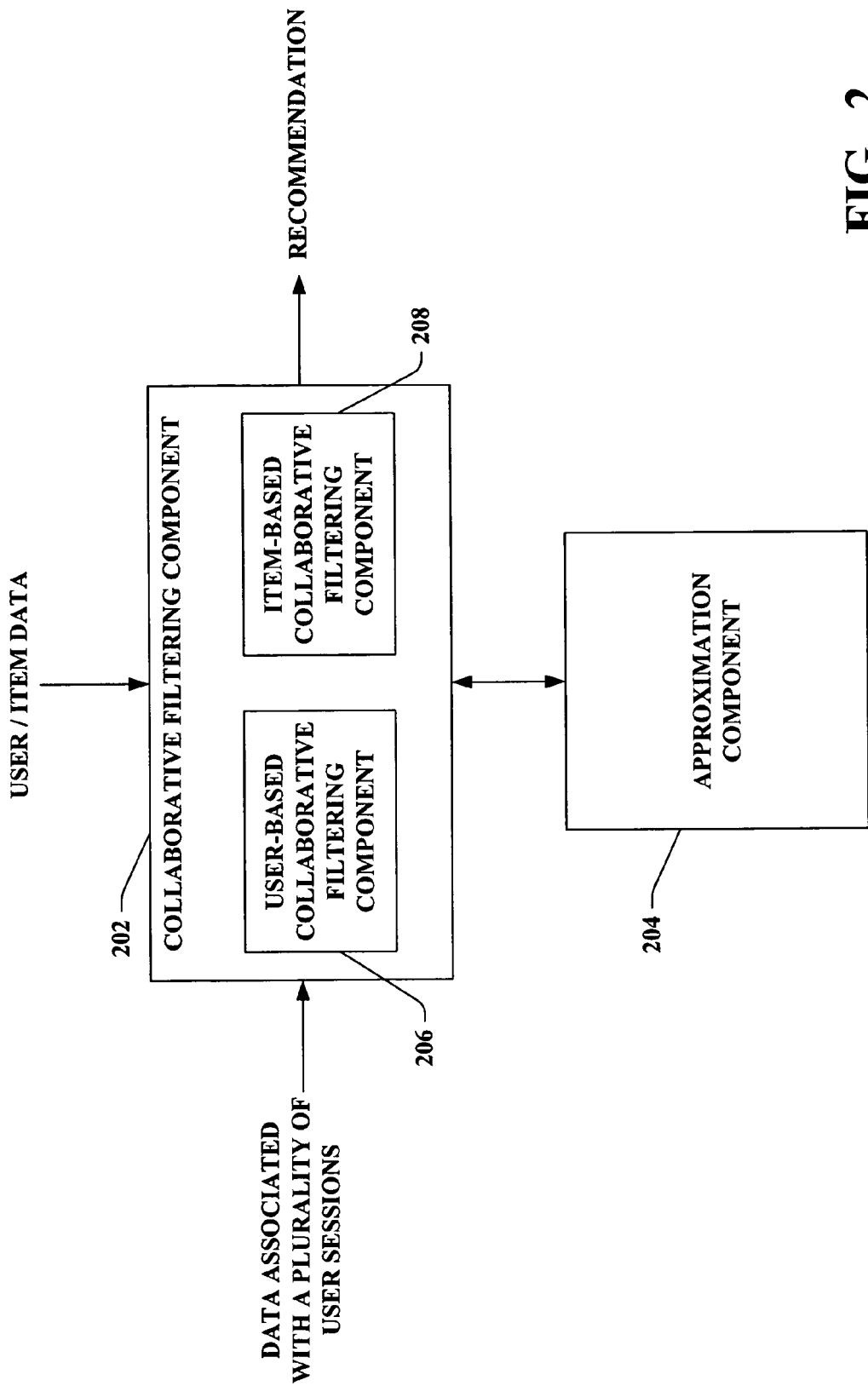
FIG. 2 illustrates a block diagram of an exemplary system that supports item-based and/or user-based collaborative filtering.

With reference to FIG. 2, illustrated is a system 200 that supports item-based and/or user-based collaborative filtering. The system 200 includes a collaborative filtering component 202 that receives data associated with a plurality of user sessions and/or data associated with a user and/or an item. The collaborative filtering component 202 can collect the user related data to identify similarities. The system 200 additionally includes an approximation component 204 that approximates similarities based at least in part on the data collected by the collaborative filtering component 202. For example, the approximation component 204 can approximate a similarity between an item and disparate items. Additionally or alternatively, the approximation component 204 can approximate a similarity between a user and disparate users.

According to an illustration, the collaborative filtering component 202 can build a two dimensional ratings matrix based on the received data, where user sessions are designated through one dimension and items through another. An example of a ratings matrix is illustrated below in Table 1:

TABLE 1

|        | ITEM X | ITEM Y | ITEM Z | ITEM W |
|--------|--------|--------|--------|--------|
| USER A | 1      | 1      |        |        |
| USER B | 1      | 1      | 1      |        |
| USER C | 1      | 1      | 1      | 1      |

It is to be appreciated that the claimed subject matter is not limited to this example. In the ratings matrix, the empty squares can signify a default rating of 0 implying that the corresponding user had not implicitly rated the item (e.g., has not viewed the item, . . . ). Additionally, squares including a 1 can indicate that the user has rated the corresponding item above a threshold (e.g., has interacted with the item, . . . ).

The collaborative filtering component 202 can further include a user-based collaborative filtering component 206 and/or an item-based collaborative filtering component 208. The user-based collaborative filtering component 206 can utilize data associated with a user to identify a disparate user that is similar, and thereby generate a recommendation. Utilizing the above ratings matrix example in Table 1, users A, B, and C have implicitly voted on items X, Y, Z, and W respectively. The user-based collaborative filtering component 206 can identify a user's nearest neighbor(s) utilizing similarities generated by the approximation component 204. Based on items voted on by the nearest neighbor, the user-based collaborative filtering component 206 can make a recommendation. Additionally or alternatively, the recommendation can be based on a set of nearest neighbors weighted by associated proximities and/or ratings.

The item-based collaborative filtering component 208 can identify similar items based on a set of users that have rated the items. For instance, the item-based collaborative filtering component 208 can utilize data associated with an item to identify a disparate item that is similar to generate a recommendation. Pursuant to an example, items that are viewed by the same users are determined to be similar utilizing the item-based collaborative filtering component 208. According to an illustration, the similarities can be approximated by the approximation component 204.

The following table (Table 2) relates to the above ratings matrix example (from Table 1) and illustrates users who have rated each item above a threshold.

TABLE 2

| ITEM | USERS   |
|------|---------|
| X    | A, B, C |
| Y    | A, B, C |
| Z    | B, C    |
| W    | C       |

Accordingly, in this example, there is a correlation between the users who viewed item X and item Y, since the same set of users interacted with each item. Thus, if a user interacts with item X, the item-based collaborative filtering component 208 can recommend item Y with high confidence, and vice versa. Additionally, utilizing the Jaccard coefficient, there is a similarity between X and Z of 2/3, which is obtained by dividing the number of users in the intersection of X and Z (which equals 2) by the number of users in the union of X and Z (which equals 3). The following table (Table 3) illustrates application of the Jaccard coefficient to all of the item pairs.

TABLE 3

|        | ITEM X | ITEM Y | ITEM Z | ITEM W |
|--------|--------|--------|--------|--------|
| ITEM X |        |        |        |        |
| ITEM Y | 1      |        |        |        |
| ITEM Z | 0.67   | 0.67   |        |        |
| ITEM W | 0.33   | 0.33   | 0.5    |        |

Figure 3:
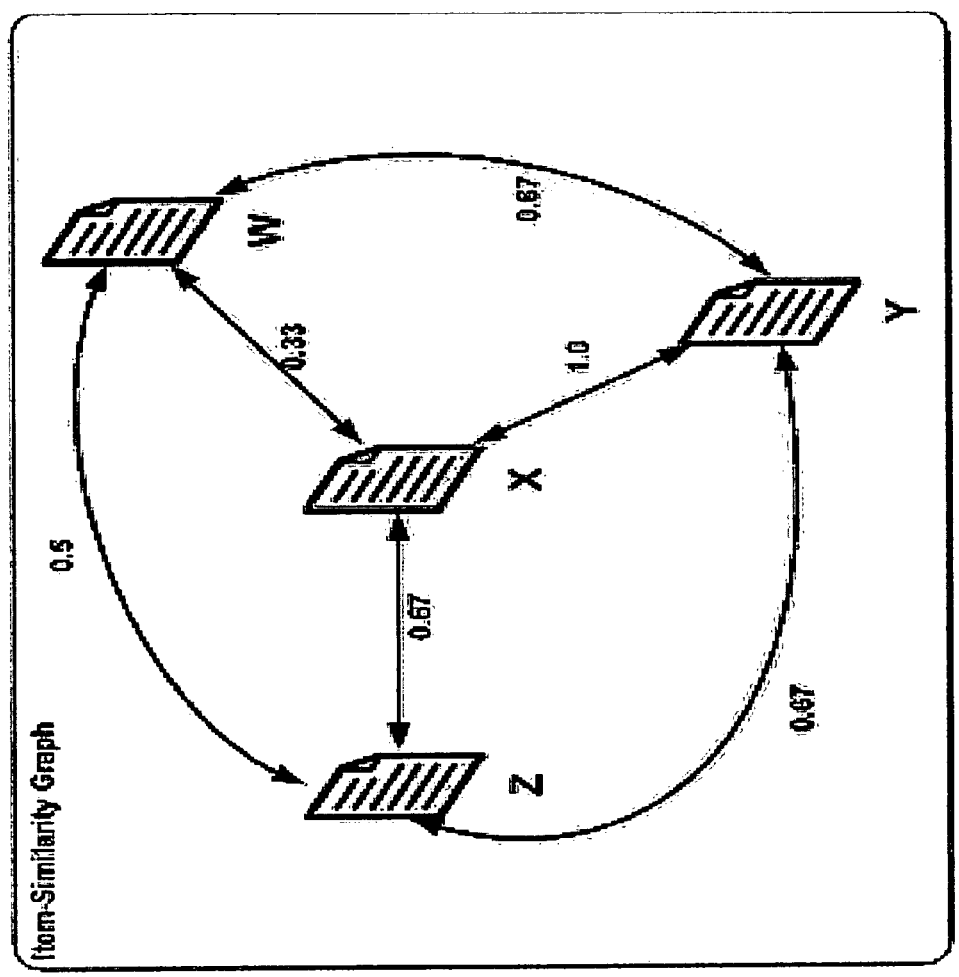
FIG. 3 illustrates a depiction of an exemplary item similarity graph.

Turning to FIG. 3, illustrated is a depiction of an item-similarity graph 300 associated with the aforementioned example (from Tables 1-3). It is to be appreciated that the claimed subject matter is not limited to this example. The graph 300 illustrates similarities between items generated by an item-based collaborative filtering component (e.g., the item-based collaborative filtering component 208 of FIG. 2). Additionally, an approximation component (e.g., the approximation component 204 of FIG. 2) can enable approximating these similarities, thereby evaluating the relationships between items quickly and efficiently. Although an item-similarity graph is depicted, it is contemplated that a user-similarity can likewise be generated utilizing the similarities obtained by a user-based collaborative filtering component (e.g., the user-based collaborative filtering component 206 of FIG. 2) and/or the approximation component.

The weights in the item-similarity graph 300 range from 0 to 1, where 1 indicates a match. As shown, items X and Y have a similarity rating of 1, which indicates that all of the users who interacted with item X also interacted with item Y. The item-based collaborative filtering component can recommend an item to a user who previously interacted with another item by returning the neighbors of the item in question sorted in descending order by the weight of the connecting edge.

Figure 4:
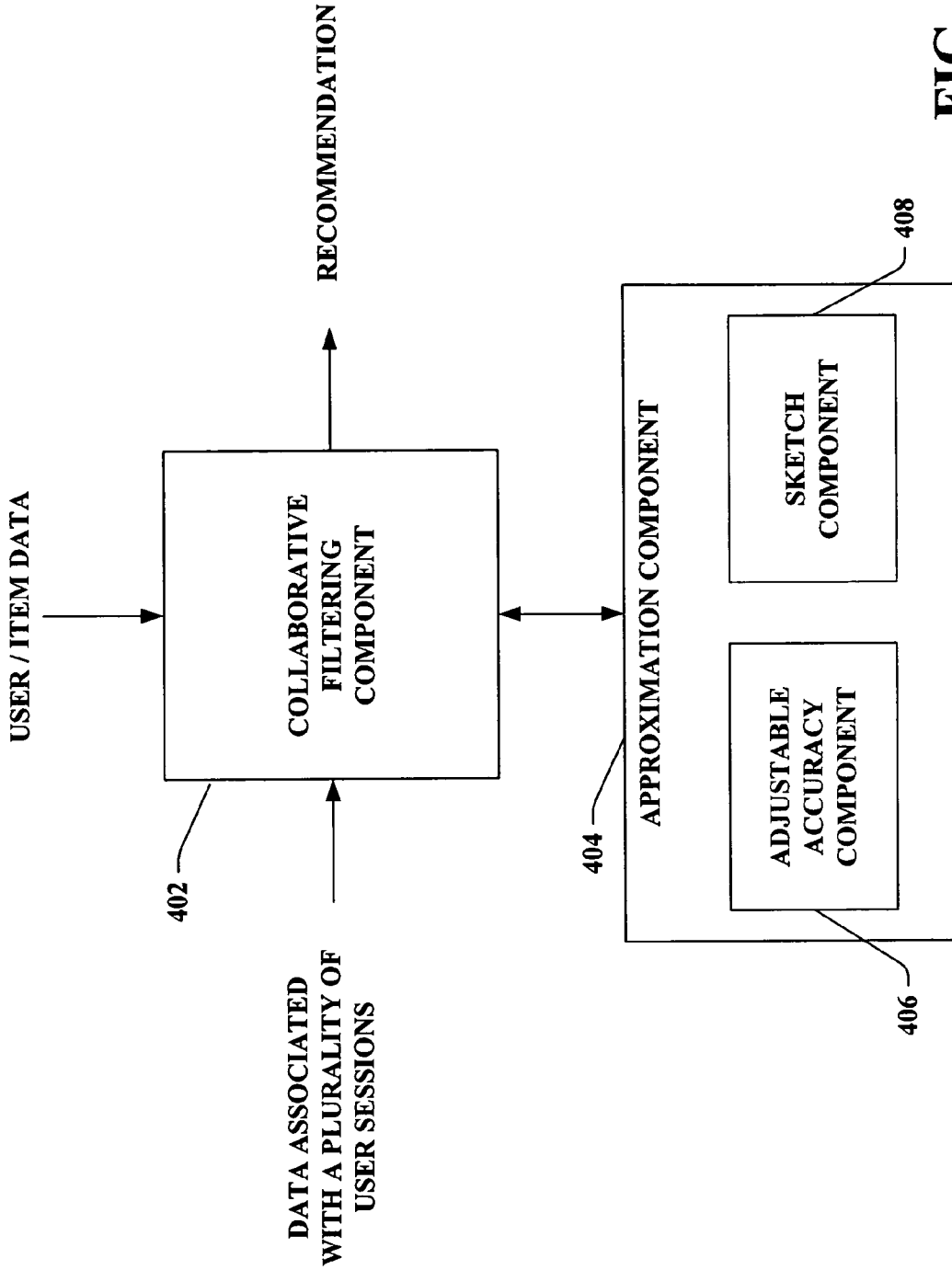
FIG. 4 illustrates a block diagram of an exemplary system that provides for adjustable accuracy for approximations utilized in connection with collaborative filtering.

With reference to FIG. 4, illustrated is a system 400 that provides for adjustable accuracy for approximations utilized in connection with collaborative filtering. The system 400 includes a collaborative filtering component 402 that obtains user interaction data associated with a number of user sessions. According to an example, the collaborative filtering component 402 can be a user-based collaborative filtering component, an item-based collaborative filtering component, etc. The collaborative filtering component 402 can additionally obtain data associated with an item and/or a user. By way of illustration, the data associated with the item and/or the user can be related to a current user session. According to this illustration, the collaborative filtering component 402 can provide a recommendation to the user associated with the current session regarding item(s) that may be of interest.

The system 400 additionally includes an approximation component 404 that facilitates approximating similarities between items and/or between users. The approximation component 404 further includes an adjustable accuracy component 406 that enables controlling a number of sketching functions that are utilized to approximate the similarity. For instance, the adjustable accuracy component 406 can be provided with an input from any source (e.g., a user, a network, a device, feedback, . . . ) indicating a number of sketching functions to employ. As the number of sketching functions is increased by the adjustable accuracy component 406, the approximation can become more accurate; however, the increase in the number of sketching functions can yield an increase in computation time.

The approximation component 404 additionally includes a sketch component 408 that randomly generates a sketching function. By way of example, the sketch component 408 can utilize the input to the adjustable accuracy component 406 to determine a number of sketching functions to produce. According to an illustration, the sketch component 408 can produce the sketching functions by randomly generating two integers and a prime. It is contemplated that these random values can be obtained in any manner. The sketch component 408 can incorporate the generated, random values in a linear modulo function such as, for example, a function in the form $f(x)=mx+b \bmod P$, where m is a first integer, b is a second integer, and P is the prime. The sketching functions that are generated can then be employed by the approximation component 404 to approximate the similarities between items and/or users.

Figure 5:
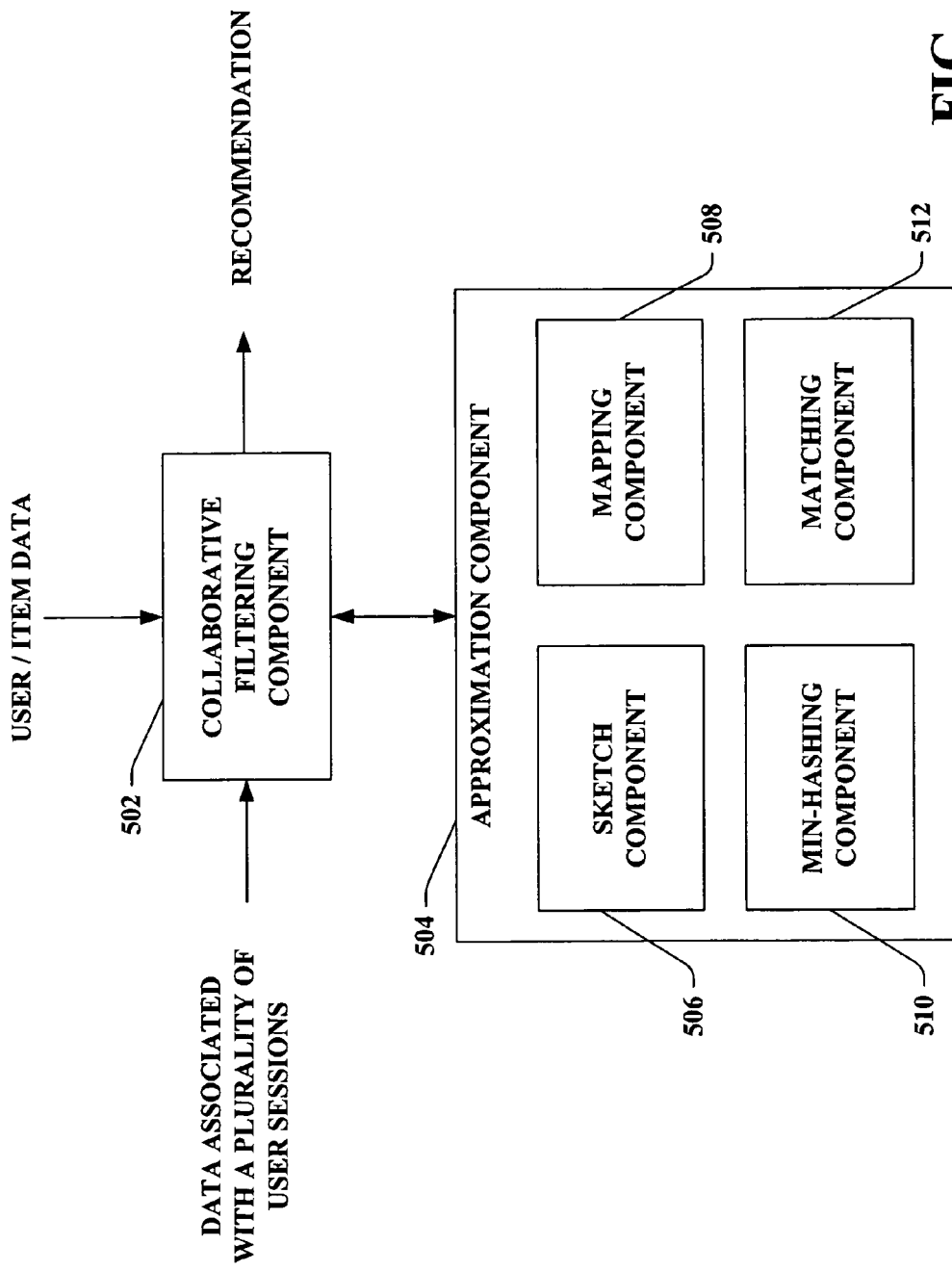
FIG. 5 illustrates a block diagram of an exemplary system that utilizes sketching functions to approximate similarities between items and/or users that can be employed in connection with collaborative filtering techniques.

Turning to FIG. 5, illustrated is a system 500 that utilizes sketching functions to approximate similarities between items and/or users that can be employed in connection with collaborative filtering techniques. The system 500 includes a collaborative filtering component 502 that collects data and generates recommendation(s) based on the data. Additionally, the collaborative filtering component 502 can employ one or more similarities generated by an approximation component 504 to provide the recommendation(s).

The approximation component 504 can further include a sketch component 506 that generates a sketching function, a mapping component 508 that maps the collected data to integer values, a min-hashing component 510 that determines an identity of particular data (e.g., particular user, particular item, . . . ) from a set of data (e.g., set of users, set of items, . . . ) associated with a minimum value produced utilizing the sketching function, and a matching component 512 that recognizes pairs with similar identities of data associated with the minimum values for the sketching function(s). The sketch component 506 can yield any number of sketching functions. Pursuant to an illustration, the sketching functions can be in the form of $f(x)=mx+b \bmod P$; however, the claimed subject matter is not so limited. The sketch component 506 can randomly generate integer values for m and b. Additionally, the sketch component 506 can randomly generate a prime for P.

According to an example, the sketch component 506 can produce three sketching functions (e.g., pursuant to an input obtained by the adjustable accuracy component 406 of FIG. 4, . . . ). It is to be appreciated that this is example is for illustration purposes and the claimed subject matter is not so limited. The sketching functions generated by the sketch component 506 can be as follows:

$$S_1(x)=x \bmod 5$$

$$S_2(x)=2x+1 \bmod 5$$

$$S_3(x)=x+2 \bmod 5$$

Additionally, the mapping component 508 can map the collected data to integer values. It is to be appreciated that any mapping can be employed; for instance, unique IDs from a database can be utilized. Returning to the example illustrated in Table 2, the mapping component 508 can utilize the following mappings for the users: A=1, B=2, and C=3. The mapping component 508 thus can produce the following sets of data associated with the items:

$$X=\{1, 2, 3\}$$

$$Y=\{1, 2, 3\}$$

$$Z=\{2, 3\}$$

$$W=\{3\}$$

It is to be appreciated that the mapping component 508 can additionally or alternatively map items to integer values to generate sets associated with users.

The min-hashing component 510 can then employ the sketching function(s) and the sets of data to determine which data within the sets yield a minimum value for the sketching function(s). For instance, the min-hashing component 510 can input $X=\{1, 2, 3\}$ into the sketching function $S_1(x)=x \bmod 5$ to generate an output equal to $\{1, 2, 3\}$. Thereafter, the min-hashing component 510 can recognize that the minimum output value is 1, which corresponds to the input of 1. Thus, the min-hashing component 510 applies each sketching function to each set, and determines the input integer that yields the smallest output value. Pursuant to the above example, the following min-hash values can be identified:

$S_1(X)=\{1, 2, 3\} \rightarrow$ Smallest integer was 1, produced by $1. \rightarrow \text{Min-Hash}_1(X)=1$ $S_1(Y)=\{1, 2, 3\}$ →Smallest integer was 1, produced by
 1.→Min-Hash$_1(Y)$=1

$S_1(Z)=\{2, 3\}$ →Smallest integer was 2, produced by
 2.→Min-Hash$_1(Z)$=2

$S_1(W)=\{3\}$ →Smallest integer was 3, produced by
 3.→Min-Hash$_1(W)$=3

$S_2(X)=\{3, 0, 2\}$ →Smallest integer was 0, produced by
 2.→Min-Hash$_2(X)$=2

$S_2(Y)=\{3, 0, 2\}$ →Smallest integer was 0, produced by
 2.→Min-Hash$_2(Y)$=2

$S_2(Z)=\{0, 2\}$ →Smallest integer was 0, produced by
 2.→Min-Hash$_2(Z)$=2

$S_2(W)=\{2\}$ →Smallest integer was 2, produced by
 3.→Min-Hash$_2(W)$=3

$S_3(X)=\{3, 4, 0\}$ →Smallest integer was 0, produced by
 3.→Min-Hash$_3(X)$=3

$S_3(Y)=\{3, 4, 0\}$ →Smallest integer was 0, produced by
 3.→Min-Hash$_3(Y)$=3

$S_3(Z)=\{4, 0\}$ →Smallest integer was 0, produced by
 3.→Min-Hash$_3(Z)$=3

$S_3(W)=\{0\}$ →Smallest integer was 0, produced by
 3.→Min-Hash$_3(W)$=3

The matching component 512 can recognize min-hash pairs that match. Further, the matching component 512 can sum the matching min-hash pairs to identify a number of min-hashes in common for each pair. Continuing the above example, the following table (Table 4) illustrates the number of min-hashes in common.

TABLE 4

|        | ITEM X | ITEM Y | ITEM Z | ITEM W |
|--------|--------|--------|--------|--------|
| ITEM X |        |        |        |        |
| ITEM Y | 3      |        |        |        |
| ITEM Z | 2      | 2      |        |        |
| ITEM W | 1      | 1      | 1      |        |

The matching component 512 can additionally divide the number of matching min-hashes by the total number of sketch functions. Thus, an approximation of the Jaccard coefficient can be obtained. Table 5 illustrates that the approximation of the Jaccard coefficient yields similar values as the calculated Jaccard coefficients shown in Table 3.

TABLE 5

|        | ITEM X | ITEM Y | ITEM Z | ITEM W |
|--------|--------|--------|--------|--------|
| ITEM X |        |        |        |        |
| ITEM Y | 1      |        |        |        |
| ITEM Z | 0.67   | 0.67   |        |        |
| ITEM W | 0.33   | 0.33   | 0.33   |        |

The approximation component 504 can also facilitate meta-sketching, for instance. As long as the number of items that hash into the same min-hash value for each sketching function is small, the aforementioned systems can run efficiently. However, if the number of collisions is large, meta-sketch collisions can be counted rather than min-hash collisions. A meta-sketch can be produced by choosing an arbitrary small subset of sketches and concatenating the min-hash values together. Thus, the chance of false positives can be reduced; however, a number of false negatives can increase. Accordingly, to counterbalance the increase in false negatives, a number of meta-sketches can be employed. The approximation component 504 can additionally or alternatively utilize meta-sketches to produce candidate pairs. Thereafter, the approximation component 504 can compute actual similarity of each pair rather than performing an approximation.

The following is exemplary pseudo code associated with approximate collaborative filtering. It is to be appreciated that the claimed subject matter is not limited to this example. As illustrated below, l is a number of min-hashes, s is a number of Metahashes, and k is a Metahash length. The first for loop can be employed to approximate a Jaccard coefficient utilizing sketches. Additionally, the generation of Metahashes can be optional. Further, the number of collisions can be counted to determine similarity.

```
For i = 1 to l
    π_i = random permutation of U, the set of all users
    // generate min hashes
    For each item X
        MinHash_i(X) = Min(π_i(X)) // iterate through each user who
        rated X
// Generate meta-hashes
Repeat s times
    Select k integers from 1 to l
    For each item X
        MetaHash mh = Concatenate the k MinHash_i(X) together for X
        MetaHashSet(mh) = MetaHashSet(mh) ∩ {X}
For each MetaHash mh in MetaHashSet
    For each pair (X, Y) in MetaHashSet(mh)
        Count[X, Y]++
// Count[X, Y] represents the similarity of X, Y
```

Figure 6:
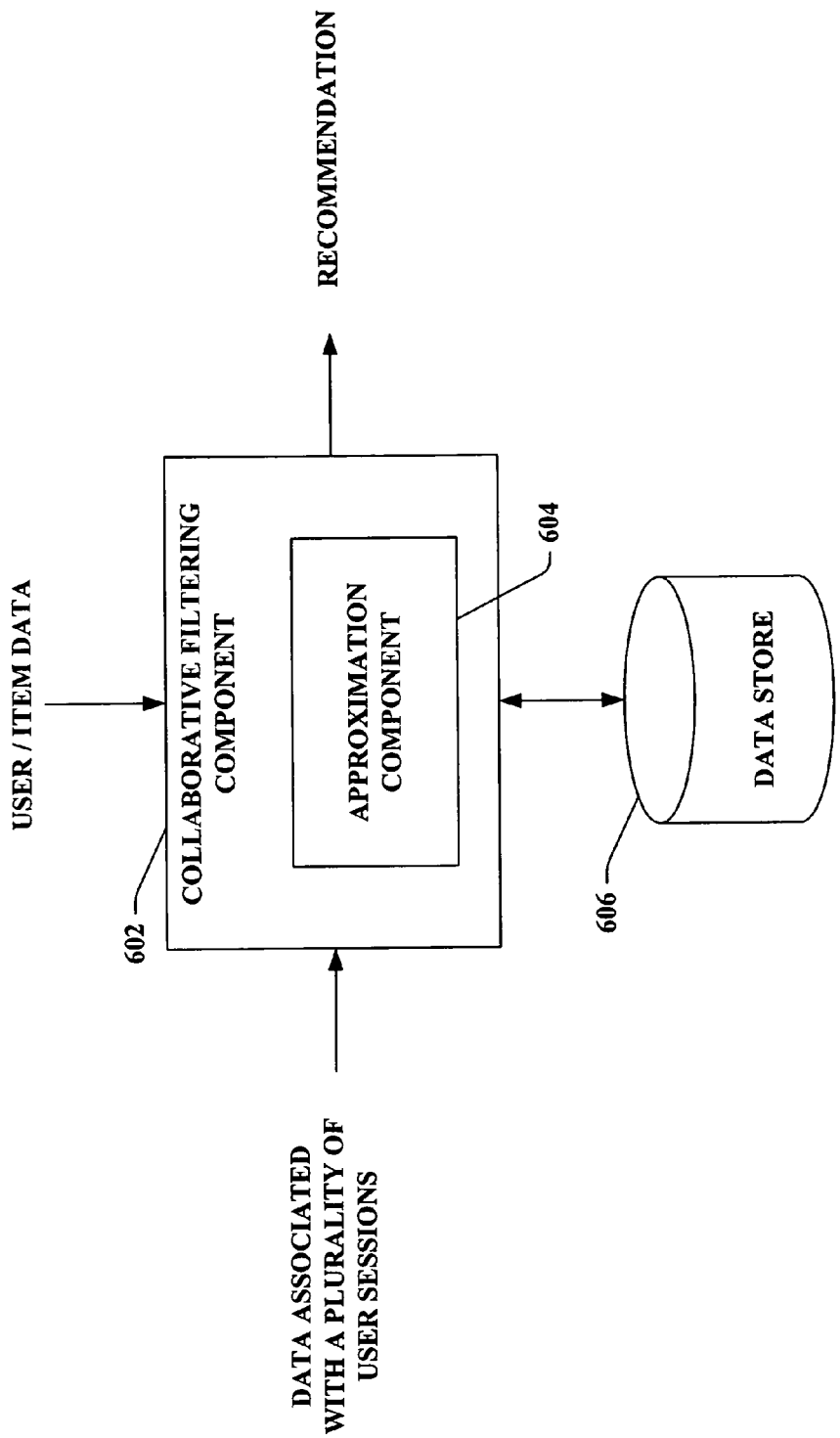
FIG. 6 illustrates a block diagram of an exemplary system that approximates similarities for utilization with collaborative filtering.

With reference to FIG. 6, illustrated is a system 600 that approximates similarities for utilization with collaborative filtering. The system 600 includes a collaborative filtering component 602 that receives data associated with a plurality of user sessions. Additionally or alternatively, the collaborative filtering component 602 can receive data associated with a user and/or data associated with an item. The collaborative filtering component 602 can include an approximation component 604, which can approximate similarities. The collaborative filtering component 602 can thereafter utilize the approximated similarities to yield recommendation(s).

The collaborative filtering component 602 and/or the approximation component 604 can store the received data in a data store 606. The data store 606 can provide storage for data associated with user(s), data associated with item(s), ratings, user actions, approximated similarities, actual similarities, sketches, etc. The data store 606 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 606 of the subject systems and methods is intended to comprise, without being limited to, these and any other suitable types of memory. In addition, it is to be appreciated that the data store 606 can be a server, a database, a hard drive, and the like.

According to an example, the collaborative filtering component 602 can receive data associated with user sessions, which can be stored in the data store 606. The approximation component 604 can then utilize the stored data to generate similarities. It is to be appreciated that the approximation component 604 can generate the approximations of the similarities at any time. For example, the approximations can be produced upon the collaborative filtering component 602 storing the collected data in the data store 606. Pursuant to another example, the approximation component 604 can provide the approximation when a recommendation is to be generated by the collaborative filtering component 602. However, the claimed subject matter is not so limited.

Figure 7:
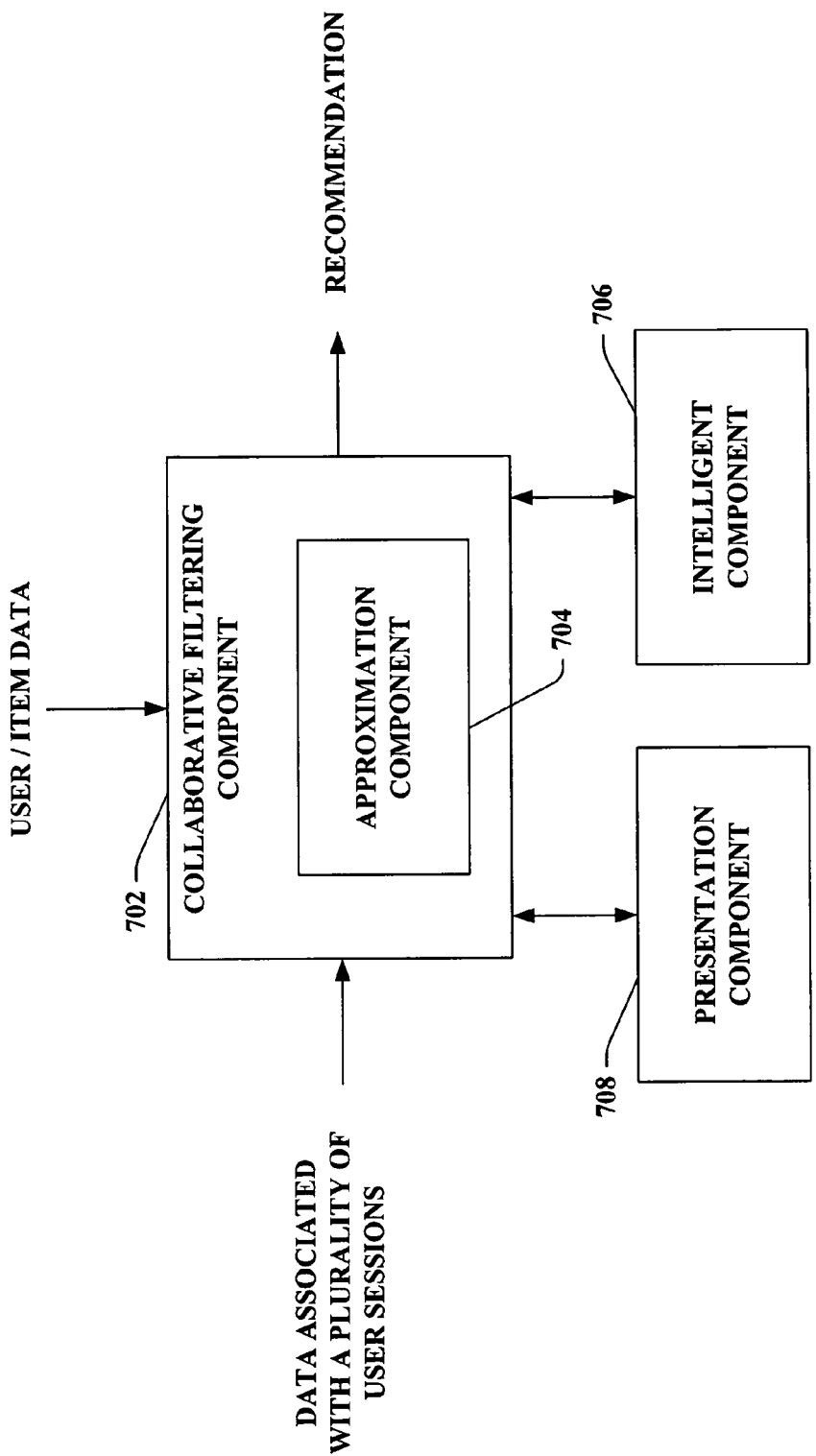
FIG. 7 illustrates a block diagram of an exemplary system that facilitates approximating similarities between items and/or users for utilization in association with collaborative filtering.

Turning to FIG. 7, illustrated is a system 700 that facilitates approximating similarities between items and/or users for utilization in association with collaborative filtering. The system 700 can include a collaborative filtering component 702 and an approximation component 704, both of which can be substantially similar to respective components described above. The system 700 further includes an intelligent component 706. The intelligent component 706 can be utilized by the approximation component 704 to facilitate approximating a similarity. For example, the intelligent component 706 can determine whether a data set is sufficiently large as to warrant approximating similarities rather than calculating the similarities (e.g., via evaluating a Jaccard coefficient, a cosine similarity, . . . ). Additionally or alternatively, the intelligent component 706 can reduce a number of possible candidate pairs for which a similarity is approximated, thereby decreasing computation time.

It is to be understood that the intelligent component 706 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 708 can provide various types of user interfaces to facilitate interaction between a user and any component coupled to the collaborative filtering component 702. As depicted, the presentation component 708 is a separate entity that can be utilized with the collaborative filtering component 702. However, it is to be appreciated that the presentation component 708 and/or similar view components can be incorporated into the collaborative filtering component 702 and/or a stand-alone unit. The presentation component 708 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the collaborative filtering component 702.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 8:
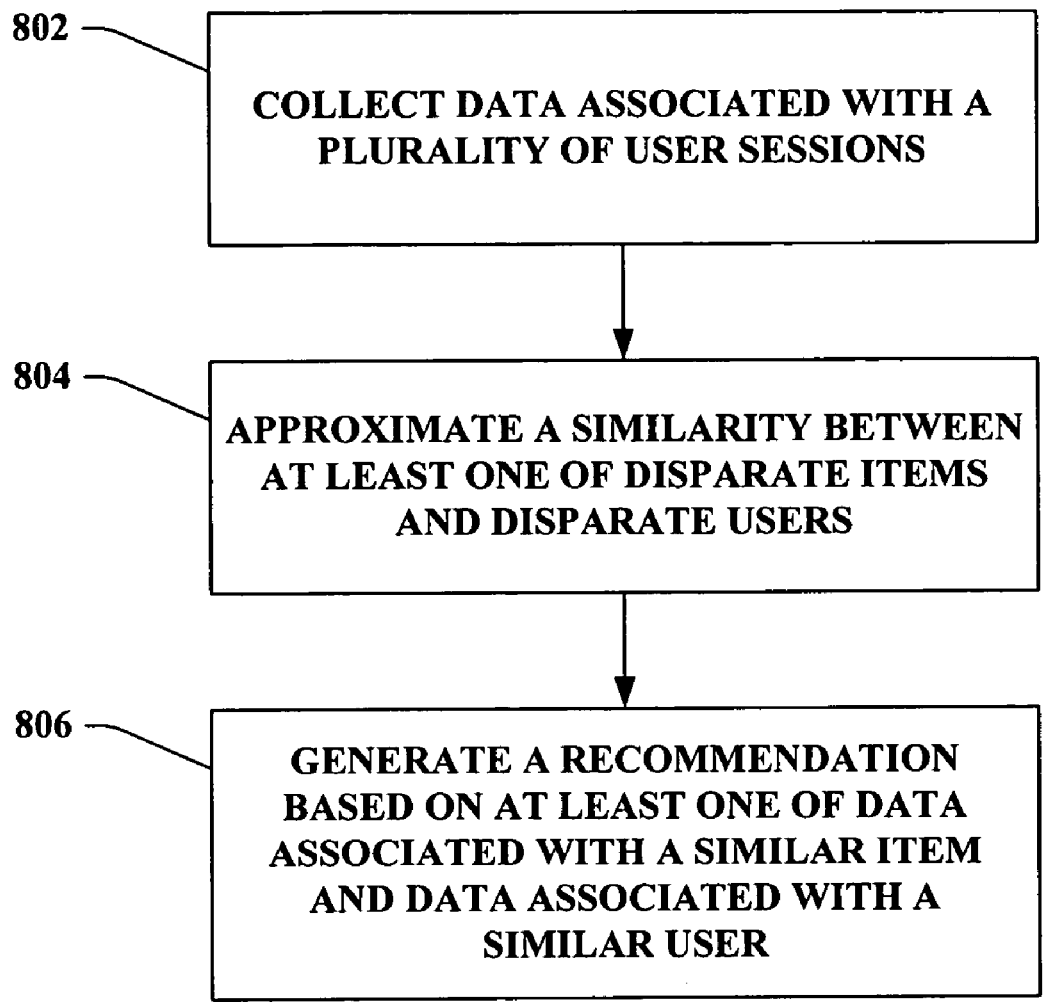
FIG. 8 illustrates an exemplary methodology that facilitates utilizing approximations in connection with collaborative filtering.
Figure 9:
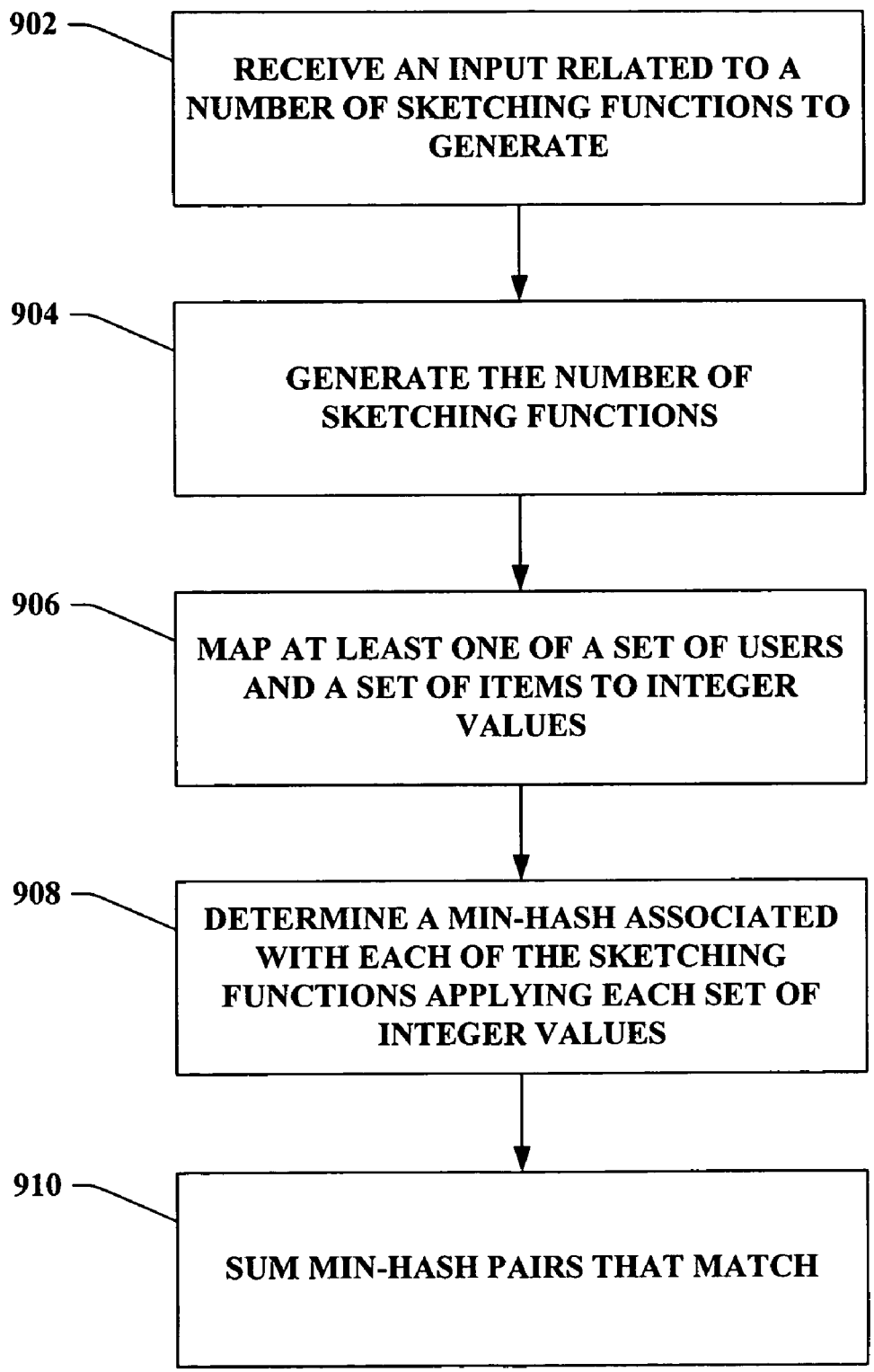
FIG. 9 illustrates an exemplary methodology that facilitates approximating similarities that can be employed with collaborative filtering techniques.

FIGS. 8-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 8, illustrated is a methodology that facilitates utilizing approximations in connection with collaborative filtering. At 802, data associated with a plurality of user sessions is collected. For instance, the data can be related to item(s) interacted with by each user during each session. Pursuant to an example, a user can view a number of web pages while browsing through a web site. Accordingly, data indicating the particular web pages that are viewed, or interacted with in any manner, can be obtained. It is to be appreciated that the claimed subject matter is not so limited. At 804, a similarity between disparate items and/or disparate users is approximated utilizing the collected data. By way of illustration, a Jaccard coefficient, a Jaccard coefficient extrapolated to multisets, a cosine similarity, etc. can be approximated thus providing scalability by reducing a number of comparisons effectuated. The similarity can be approximated, for example, via utilizing sketching functions. At 806, a recommendation is generated based on data associated with a similar item and/or data associated with a similar user. For instance, a most similar item and/or user can be identified. If a most similar item is identified, it can be provided as a recommendation. If a most similar user is recognized, then items rated above a threshold by the similar user are yielded as a recommendation. Additionally or alternatively, a number of similar users and/or items can be utilized in connection with providing recommendations. Pursuant to an example, the approximated similarity can be utilized to order the recommendations.

Turning to FIG. 9, illustrated is a methodology that facilitates approximating similarities that can be employed with collaborative filtering techniques. At 902, an input is received related to a number of sketching functions to generate. An accuracy of an approximation can be directly related to the number of sketching functions, such that an increase in the number of sketching functions employed yields an increased accuracy. However, increasing the number of sketching functions can produce greater computation requirements. At 904, the sketching functions are generated. For instance, the sketching functions can be in the form $f(x)=mx+b \mod P$. Pursuant to this example, two integers and a prime can be randomly generated such that m and b are the integers and P is the prime. At 906, a set of users and/or a set of items are mapped to integer values. It is contemplated that any mapping can be employed. By way of illustration and not limitation, the mapping can be related to unique database IDs. At 908, a min-hash associated with each of the sketching functions applying each set of integer values is determined. Thus, the item and/or user from a set associated with the minimum value that results from employing the sketching function can be identified. At 910, min-hash pairs that match can be summed. The number of min-hashes in common can additionally be divided by the number of sketch functions, which can yield a similarity that approximates the Jaccard coefficient, for instance.

Figure 10:
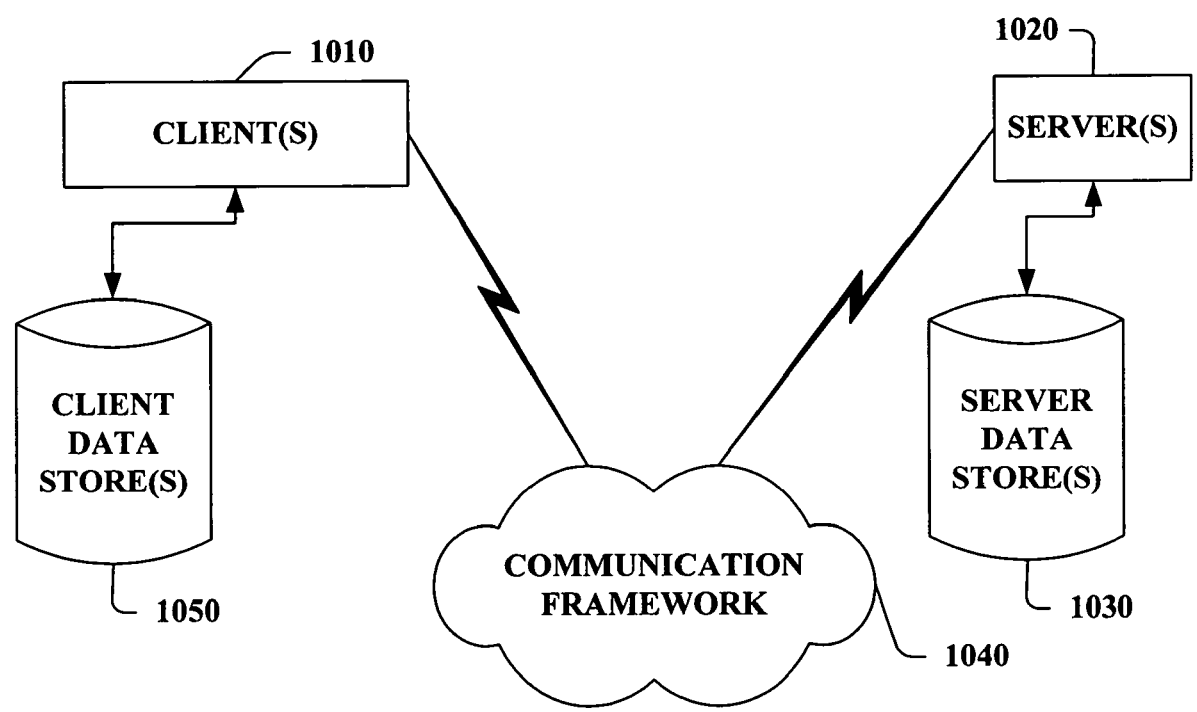
FIG. 10 illustrates an exemplary networking environment, wherein the novel aspects of the claimed subject matter can be employed.
Figure 11:
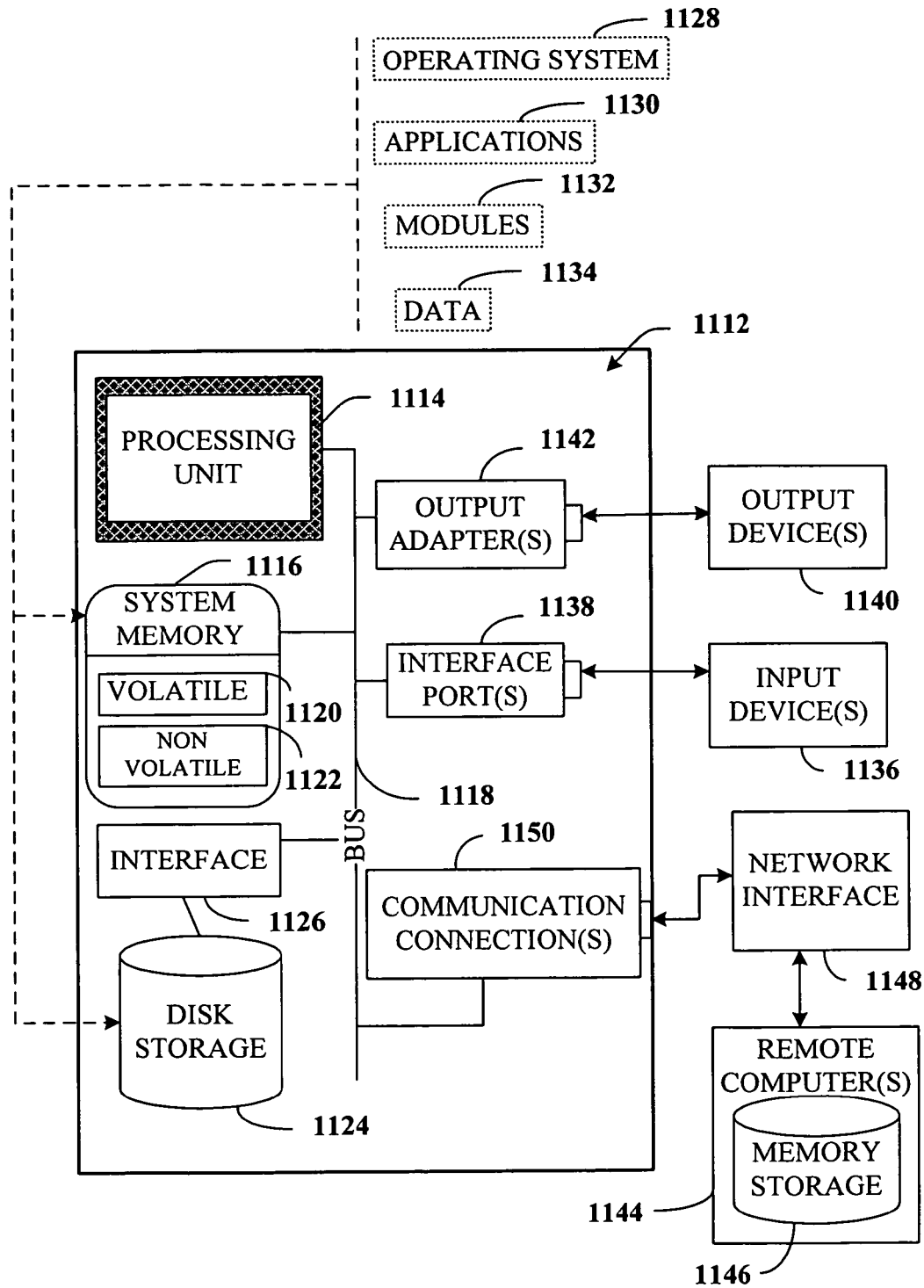
FIG. 11 illustrates an exemplary operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that enables scalable collaborative filtering, the system comprising:
   a processor;
   system memory; and
   one or more computer storage media having stored thereon:
      a collaborative filtering component configured to receive data associated with a plurality of user sessions and to generate a recommendation based on one or more similarities among the user sessions, the data associated with the user sessions including:
first data indicating a plurality of users;
second data indicating a plurality of items; and
third data indicating ratings of the items by the users;
an approximation component configured to approximate the one or more similarities that the collaborative filtering component uses to generate the recommendation, the approximation component comprising:
an adjustable accuracy component configured to receive input indicating a number of sketching functions;
a sketch component configured to generate sketching functions according to the number indicated by the input received by the adjustable accuracy component, the generated sketching functions including a first sketching function in a form f(x)=mx+b mod P, wherein m is a first randomly generated integer, b is a second randomly generated integer, and P is a randomly generated prime number, the sketch component configured to randomly generate the first integer, the second integer, and the prime number;
a mapping component configured to individually map the users to unique integers and to generate individual data sets linked to each of the items, each data set including one or more of the unique integers to indicate that the one or more users which are mapped to the one or more unique integers rated the linked item above a threshold rating;
a min-hashing component configured to:
generate hash values by selecting each data set and applying the generated sketching functions to the one or more unique integers in the selected data set;
for each sketching function applied to the selected data set, identify a min-hash value from among the hash values generated using the applied sketching function and the selected data set; and
associate each identified min-hash value with the item linked to the selected data set;
a matching component configured to:
compare the min-hash values associated with the items;
based on the comparison, calculate a total of min-hash value matches for pairs of items; and
generate an approximate Jaccard coefficient for each pair of items by dividing the total of min-hash value matches for the pair of items by the number of sketching functions generated and applied to the data sets linked to the items; and
a component configured to determine whether the data associated with a plurality of user sessions is sufficiently large as to warrant approximating the one or more similarities that the collaborative filtering component uses to generate the recommendation rather than calculating the one or more similarities.

2. The system of claim 1, wherein the collaborative filtering component further comprises a user-based collaborative filtering component that utilizes the data associated with the user to identify a disparate user that is similar to generate the recommendation.

3. The system of claim 1, wherein the collaborative filtering component further comprises an item-based collaborative filtering component that utilizes the data associated with the item to identify a disparate item that is similar to generate the recommendation.

4. By a computing system including a processor and system memory, a method that facilitates utilizing approximations in connection with collaborative filtering, the method comprising:
collecting data associated with a plurality of user sessions, the data associated with the user sessions including:
first data indicating a plurality of users;
second data indicating a plurality of items; and
third data indicating interactions with the items by the users;
receiving first input indicating a number of sketching functions;
generating a plurality of sketching functions according to the number indicated by the first input, the generated sketching functions including a first randomly generated sketching function in a form f(x)=mx+b mod P, wherein m is a first randomly generated integer, b is a second randomly generated integer, and P is a randomly generated prime number;
individually mapping the users to unique integers;
generating individual data sets linked to each of the items, each data set for each item including one or more of the unique integers to indicate that the one or more users which are mapped to the one or more unique integers interacted with the item;
generate hash values by selecting each data set and applying the generated sketching functions to the one or more unique integers in the data set;
for each sketching function applied to a selected data set, identify a min-hash value from among the hash values generated using the applied sketching function and the selected data set, and associate the identified min-hash value with the item linked to the selected data set;
compare the min-hash values associated with the items;
based on the comparison, calculate a total of min-hash value matches for pairs of items;
generate an approximate Jaccard coefficient for each pair of items by dividing the total of min-hash value matches for the pair of items by the number of sketching functions generated and applied to the data sets linked to the pair of items; and
generating a recommendation based on at least one approximate Jaccard coefficient generated for a pair of items.

5. The method of claim 4, wherein each data set for each item includes one or more of the unique integers to indicate that the one or more users which are mapped to the one or more unique integers rated the item above a threshold.

6. The method of claim 4, wherein each data set for each item includes one or more of the unique integers to indicate that the one or more users which are mapped to the one or more unique integers bought the item.

7. The method of claim 4, wherein each data set for each item includes one or more of the unique integers to indicate that the one or more users which are mapped to the one or more unique integers viewed the item.

8. A system that enables scalable collaborative filtering using data associated with a plurality of user sessions, the data associated with the user sessions including first data indicating a plurality of users, second data indicating a plurality of items, and third data indicating interactions with the items by the users, the users being individually mapped to unique identifiers, the system comprising:
one or more processors;
system memory; and
one or more computer storage media having stored thereon computer-executable instructions for performing a method, the method including:
receiving first input indicating a number of hashing functions;
generating a plurality of hashing functions according to the number indicated by the first input, including randomly generating at least one hashing function in a form f(x) =mx+b mod P, wherein m is a first randomly generated integer, b is a second randomly generated integer, and P is a randomly generated prime number;
generating individual data sets linked to each of the items, each data set for each item including one or more of the unique identifiers to indicate that the one or more users which are mapped to the one or more unique identifiers interacted with the item;
generate hash values by selecting each data set and applying the generated hashing functions to the one or more unique identifiers in the data set;
for each hashing function applied to a selected data set, identify a min-hash value from among the hash values generated using the applied hashing function and the selected data set, and associate the identified min-hash value with the item linked to the selected data set;
compare the min-hash values associated with the items;
based on the comparison, calculate a total of min-hash value matches for pairs of items;
generate an approximate Jaccard coefficient for each pair of items by dividing the total of min-hash value matches for the pair of items by the number of hashing functions generated and applied to the data sets linked to the pair of items; and
generating a recommendation based on at least one approximate Jaccard coefficient generated for a pair of items.

9. The system of claim 8, wherein each data set for each item includes one or more of the unique integers to indicate that the one or more users which are mapped to the one or more unique integers rated the item above a threshold.

10. The system of claim 8, wherein each data set for each item includes one or more of the unique integers to indicate that the one or more users which are mapped to the one or more unique integers bought the item.

11. The system of claim 8, wherein each data set for each item includes one or more of the unique integers to indicate that the one or more users which are mapped to the one or more unique integers viewed the item.

* * * * *